US007505159B2

(12) United States Patent  
Ohara

(10) Patent No.: US 7,505,159 B2  
(45) Date of Patent: Mar. 17, 2009

(54) PRINTING SYSTEM, PRINTING APPARATUS, PROGRAM AND METHOD FOR DISPLAYING A PRINTING OPERATION

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 972 days.

(21) Appl. No.: 10/390,725

(22) Filed: Mar. 19, 2003

(65) Prior Publication Data

US 2003/0234957 A1 Dec. 25, 2003

(30) Foreign Application Priority Data

Mar. 22, 2002 (JP) ............................. 2002-080859

(51) Int. Cl.  
*G06F 15/00* (2006.01)

(52) U.S. Cl. .................... 358/1.15; 358/1.16; 358/1.17; 709/202; 709/203

(58) Field of Classification Search ................ 358/1.15, 358/1.16, 1.17, 448; 709/203, 204, 224  
See application file for complete search history.

(56) References Cited

U.S. PATENT DOCUMENTS

| | | | |
|---|---|---|---|
| 5,293,463 | A | 3/1994 | Masuda |
| 5,579,447 | A | 11/1996 | Salgado |
| 6,747,754 | B1 | 6/2004 | Iyoki |
| 7,120,910 | B2 * | 10/2006 | Matsuda et al. ............. 718/102 |
| 7,158,247 | B2 * | 1/2007 | Simpson et al. ............ 358/1.15 |
| 7,246,147 | B2 * | 7/2007 | Kim et al. .................. 709/203 |
| 7,271,926 | B2 * | 9/2007 | Amemiya .................. 358/1.15 |

| | | | |
|---|---|---|---|
| 2002/0001104 | A1 * | 1/2002 | Shima ........................ 358/442 |
| 2002/0036695 | A1 * | 3/2002 | Kawade ..................... 348/222 |
| 2003/0107777 | A1 * | 6/2003 | Yamade et al. ............. 358/442 |

FOREIGN PATENT DOCUMENTS

| | | |
|---|---|---|
| JP | A 4-118769 | 4/1992 |
| JP | B2 5-47028 | 7/1993 |
| JP | A-11-154066 | 6/1999 |
| JP | A-11-184784 | 7/1999 |
| JP | A 2000-62301 | 2/2000 |

(Continued)

OTHER PUBLICATIONS

Andy Moore, Moore's Imaging Dictionary 1993, Telecom Library, p. 193.*

(Continued)

*Primary Examiner*—Chan S Park  
(74) *Attorney, Agent, or Firm*—Oliff & Berridge, PLC

(57) ABSTRACT

A printing system includes a data processing terminal and a printer. When the printer receives a print request of print target data from the data processing terminal, a data processing unit of the printer develops the print target data into print data in the bitmap format by page, concurrently with the creation of thumbnails by page. When the data processing unit requests the printer to deliver a print progress monitoring page, the printer displays a thumbnail of a printed page of the print job being currently processed, via a Web server. In addition, the Web server creates a data file, in which a command for automatically refreshing a Web browser is written, that is delivered to the data processing terminal.

21 Claims, 16 Drawing Sheets

FOREIGN PATENT DOCUMENTS

| | | | |
|---|---|---|---|
| JP | 2000089923 A * | 3/2000 | |
| JP | A-2001-34565 | 2/2001 | |
| JP | A-2001-160882 | 6/2001 | |
| JP | A 2001-160882 | 6/2001 | |
| JP | A-2001-175622 | 6/2001 | |
| JP | A 2001-211129 | 8/2001 | |
| JP | A 2002-163511 | 6/2002 | |

OTHER PUBLICATIONS

U.S. Appl. No. 09/383,754, filed Aug. 26, 1999, Miyake.

* cited by examiner

PRINTING SYSTEM, PRINTING APPARATUS, PROGRAM AND METHOD FOR DISPLAYING A PRINTING OPERATION

BACKGROUND OF THE INVENTION

1. Field of Invention

The invention relates to a technique for informing progress of processing being performed by a printing apparatus, which is connected to a network.

2. Description of Related Art

Conventionally, a printing apparatus informs a user of progress of a printing operation via a display of a client personal computer, which requested the printing apparatus to perform the printing operation. By displaying the print progress on the display, user's insecure feelings or nerves, which may be caused when it takes a lot of time to complete the printing operation, are eradicated. The print progress shows, for example, the number of printed pages.

However, special software needs to be installed in the client computer to display the print progress on its display. Especially, when the client computer is connected with a network so as to use a plurality of different types of printing apparatuses, the special software needs to be installed in the client computer for every printing apparatus. Further, when the printing apparatus is replaced with a different type of a printing apparatus or when a new printing apparatus is additionally connected to the client computer, the special software needs to be updated or new software needs to be installed for the new printing apparatus, which is burdensome for the user.

The user might get bored seeing only incrementing page numbers while waiting for completion of the printing operation. In addition, the user cannot confirm how much of the processing of the printing operation has been completed by only looking at the page number unless the user clearly knows a relationship between the contents and the page numbers. It is assumed that, because it takes a lot of time to complete the print job, a user may desire to cancel a print job being currently printed at the point when the user determines that printing of necessary pages has been completed. However, the print progress of the print job is shown only by a page number, so the user cannot determine an appropriate timing for canceling the print job from such print progress information.

SUMMARY OF THE INVENTION

The invention provides a system wherein a data processing terminal can easily obtain progress of a printing operation being performed by a printing apparatus, and more particularly, to a system wherein a user can immediately confirm progress of a printing operation by contents and page number.

According to one aspect of the invention, a printing apparatus that performs a printing operation based on a print job includes a Web page providing unit that provides a Web page, which shows a progress of the print job being performed by the printing apparatus in response to a request from a Web browser for browsing the Web page.

Accordingly, in the printing apparatus of the invention, the print progress of the print job being executed by the printing apparatus can be confirmed by browsing the Web page using a universal method regardless of the type of printing apparatus.

BRIEF DESCRIPTION OF THE DRAWINGS

Embodiments of the invention will be described in detail with reference to the following figures wherein.

DETAILED DESCRIPTION OF PREFERRED EMBODIMENTS

Embodiments of the invention will be described below with reference to the accompanying drawings.

Figure 1:
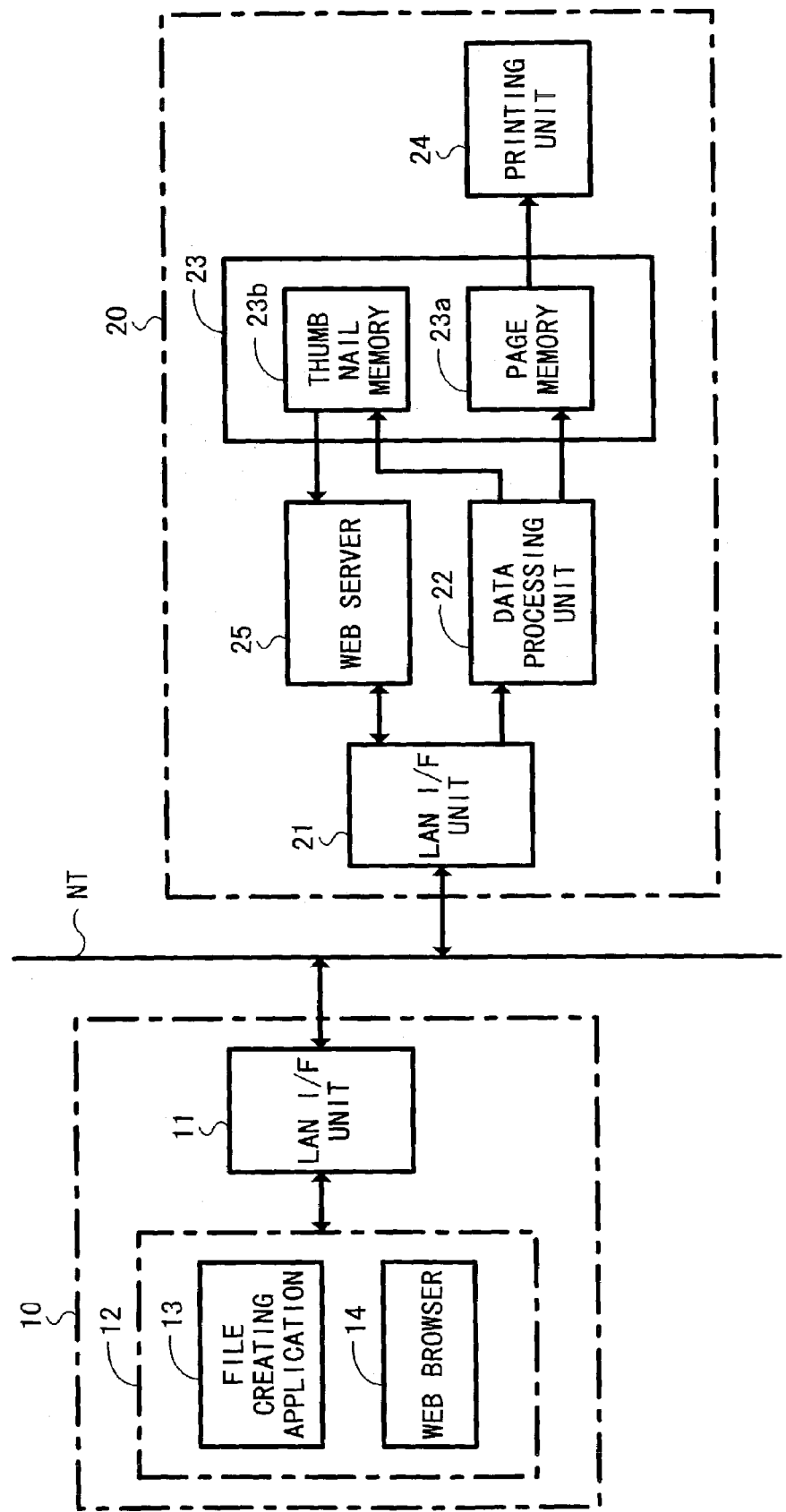
FIG. 1 is a schematic diagram showing a configuration of a printing system and a functional structure of each device constituting the printing system according to a first embodiment.

As shown in FIG. 1, a printing system 1 of a first embodiment includes a data processing terminal 10, such as a personal computer, and a printer 20, as a printing apparatus, that performs a printing operation in response to a print request from the data processing terminal 10. In the printing system 1, the data processing terminal 10 and the printer 20 are connected with each other via a network NT, such as a local-area network (LAN).

The data processing terminal 10 includes a LAN interface (I/F) unit 11 and a processing unit 12. The LAN interface unit 11 controls communication with the printer 20 and other data processing terminals. The processing unit 12 performs various processing and operations by using, for example, a mouse, a keyboard, a display, a speaker, and an external storage unit (not shown), as well as the LAN interface unit 11.

Application software (hereinafter, referred to as a file creating application) 13 and a web browser 14 are installed in the data processing terminal 10. The file creating application 13 performs processing to create a file including text and images and processing to request the printer 20 to print the contents of the created file. The Web browser 14 performs processing to transmit an HTTP request command that includes a path (URL) of a requested Web page, and processing to display the Web page, which is provided in response to the HTTP request command, on a display.

As print target data, which is to be transmitted to the printer 20 when the data processing terminal 10 requests the printer 20 to perform a printing operation, the file creating application 13 creates data described in the page-description language (hereinafter referred to as PDL data), such as PostScript, or data in the bitmap format (hereinafter referred to as BM data), by which PDL data is developed.

The printer 20 includes a LAN interface (I/F) unit 21, a data processing unit 22, a data storage unit 23, a printing unit 24, and a Web server 25. The Web server 25 functions as a Web page providing unit and the LAN interface unit 21 controls communication with the data processing terminal 10 connected via the network NT. Upon receipt of a print request from the data processing terminal 10 via the LAN interface unit 21, the data processing unit 22 creates print data in the bitmap format, which can be actually printed, and a thumbnail, which is a small image representation of a large image and in resolution lower than the print data, based on print target data targeted for a print request received from the data processing terminal 10. The data storage unit 23 includes a page memory 23a, which stores the print data, and a thumbnail memory 23b, which stores the thumbnail created by the data processing unit 22. The printing unit 24 drives a printing portion (not shown), which includes a sheet feed mechanism and a sheet discharge mechanism, to perform printing onto a recording medium, such as a sheet, by using the print data stored in the data storage unit 23. The Web server 25 creates and delivers a Web page, which is specified by an URL included in an HTTP request command issued from the data processing terminal 10 via the LAN interface unit 21, and performs processing which corresponds to an operation performed on the Web page.

The data processing unit 22, the printing unit 24, and the Web server 25 are implemented as processing to be executed by a microcomputer provided in the printer 20.

The Web server 25 includes a printer function setting page, in which the setting of various functions of the printer 20 can be performed through the network NT, and a print progress monitoring page, which shows progress of a printing operation of a specified print request (print job), as a deliverable Web page.

The processing to be executed by the data processing unit 22 will be described with reference to FIG. 2. When the printer 20 starts up, a job queue is created in the data storage unit 23 to place job objects therein. The job object is to be created for a print job, which is accepted by the printer 20.

As the data processing unit 22 starts the processing, first, data, which has been received via the LAN interface unit 21 and stored in a receiving buffer (not shown), is read, for example, by one byte, from the receiving buffer at step 110 (hereinafter, S stands for step). Then, at S120, it is determined whether the read data is defined as a job start (the top of the print job).

When the read data is not defined as a job start (S120:NO), flow moves to S150. When the read data is defined as a job start (S120:YES), flow moves to S130. At S130, a job object (New Job) for the print job is created and added to a tail end of the job queue. The job object includes a page queue to place a page object therein. The page object is to be created for each page of print target data.

Next, at S140, the job object created at S130 is assigned as a current job, which represents a job object currently being processed. In addition, a status of the current job is set to "under processing", which means that the current job is under processing of development into print data. After this processing, flow goes back to S110.

When a negative judgment is made at S120, it is determined whether the read data is defined as a page start (the top of a page), at S150. When the read data is not defined as a page start (S150:NO), flow moves to S180. When the read data is defined as a page start (S150:YES), flow moves to S160. At S160, a page object (New Page) for the page is created and added to a tail end of a page queue in the current job. The page object includes at least a pointer for pointing to the page memory 23a, which stores print data for the page, and the thumbnail memory 23b, which stores thumbnails.

At S170, the page object created at S160 is assigned as a current page, which represents a page object currently being processed. In addition, a status of the current page is set to "under processing", which means that the current page is under processing of development into print data. Then, flow goes back to S110.

When a negative judgment is made at S150, it is determined whether the read data is defined as the middle of the page, at S180. When the read data is not defined as the middle of the page (180:NO), flow moves to S200. When the read data is defined as the middle of the page (S180:YES), flow moves to S190. At S190, print data and a thumbnail are created based on the read data, and then stored in the page memory 23a for current pages and the thumbnail memory 23b, respectively. After that, flow goes back to S110.

Figure 3:
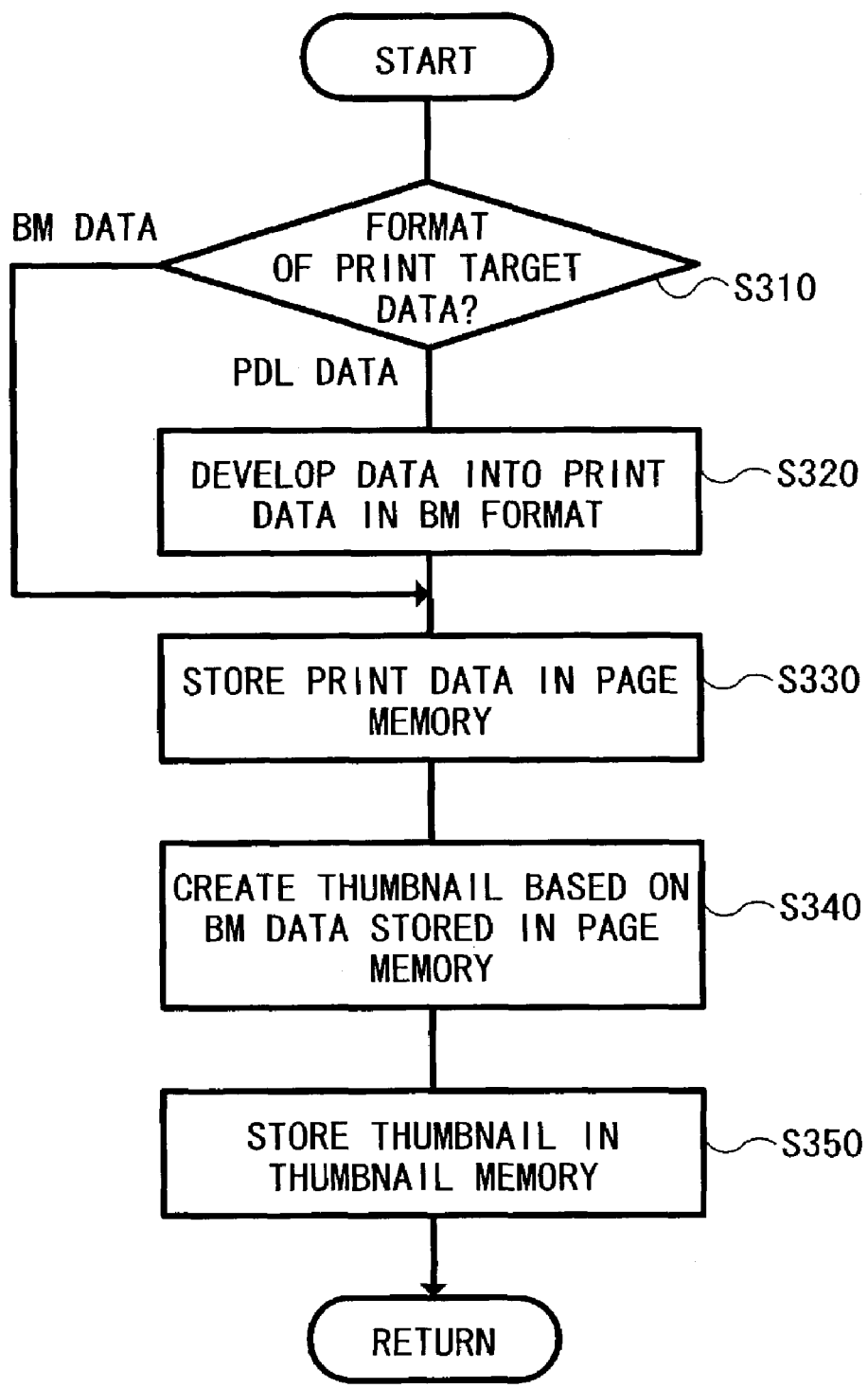
FIG. 3 is a flowchart showing details of processing of S190 of FIG. 2.

The processing of S190 will be described in detail with reference to FIG. 3.

First, at S310, it is determined, as to the format of the print target data provided from the data processing terminal 10, whether the data is in the PDL format or in the BM format. When the data is in the PDL format (S310:PDL data), flow moves to S320 to develop the PDL data, as the print target data, into BM data. After that, the BM data is stored in the page memory 23a for the current page at S330. When the data is in the BM format (S310:BM data), the BM data, as the print target data, is stored as it is, in the page memory 23a for the current page at S330.

Then, at S340, a thumbnail in the Portable Network Graphics (PNG) format is created based on the print data stored in the page memory 23a. The thumbnail may be in the other format, such as Graphics Interchange Format (GIF), Windows Bitmap (BMP) file format, Tagged Image File Format (TIFF), or Joint Photographic Experts Group (JPEG) format. Next, at S350, the created thumbnail is stored in the thumbnail memory 23b for the current page, and then flow goes back to S110.

Figure 2:
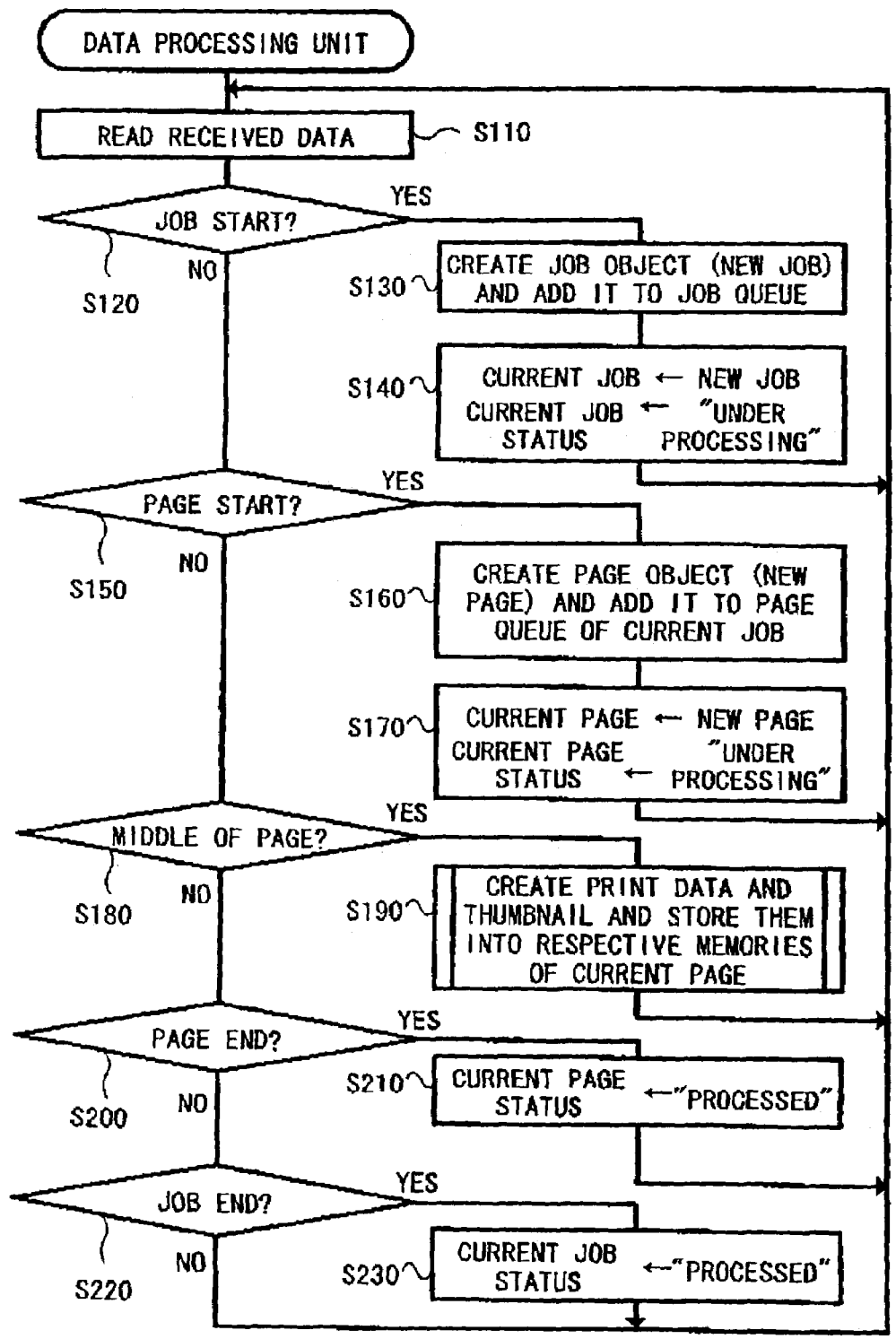
FIG. 2 is a flowchart showing processing to be executed by a data processing unit.

Referring to FIG. 2, at S200, it is determined whether the read data is defined as a page end (the end of the page). When the read data is not defined as a page end (S200:NO), flow moves to S220. When the read data is defined a page end (S200:YES), flow moves to S210. At S210, the status of the current page is set to "processed", and flow goes back to S110.

When a negative judgment is made at S200, it is determined whether the read data is defined as a job end (the end of the print job), at S220. When the read data is not defined as a job end (220:NO), flow goes back to S110. When the read data is defined as a job end (S220:YES), flow moves to S230. At S230, the status of the current job is set to "processed". After that, flow goes back to S110.

That is, at the above-described processing, a job object (Job1, Job2, . . . ) is created every time a job start of data is detected, and the created job object is serially added to the tail end of the job queue, which has been created at the startup of the printer 20. The job object, which is newly added to the tail end of the job queue, is assigned as a current job. Each job object includes a page queue.

A page object (Page1, Page2, . . . ) is created every time a page start of data (e.g. a sheet discharge command) is detected. The page object is serially added to the tail end of the page queue of the current print job. The page object, which is newly added to the tail end of the page queue, is assigned as a current page. Each page object includes pointers which point to the page memory 23*a* and the thumbnail memory 23*b*.

Every time the middle of the page is detected, print data and a thumbnail, which are created based on data indicated in the page, are serially stored in the respective storage areas specified by the pointers included in the current page of the current print job.

Figure 4:
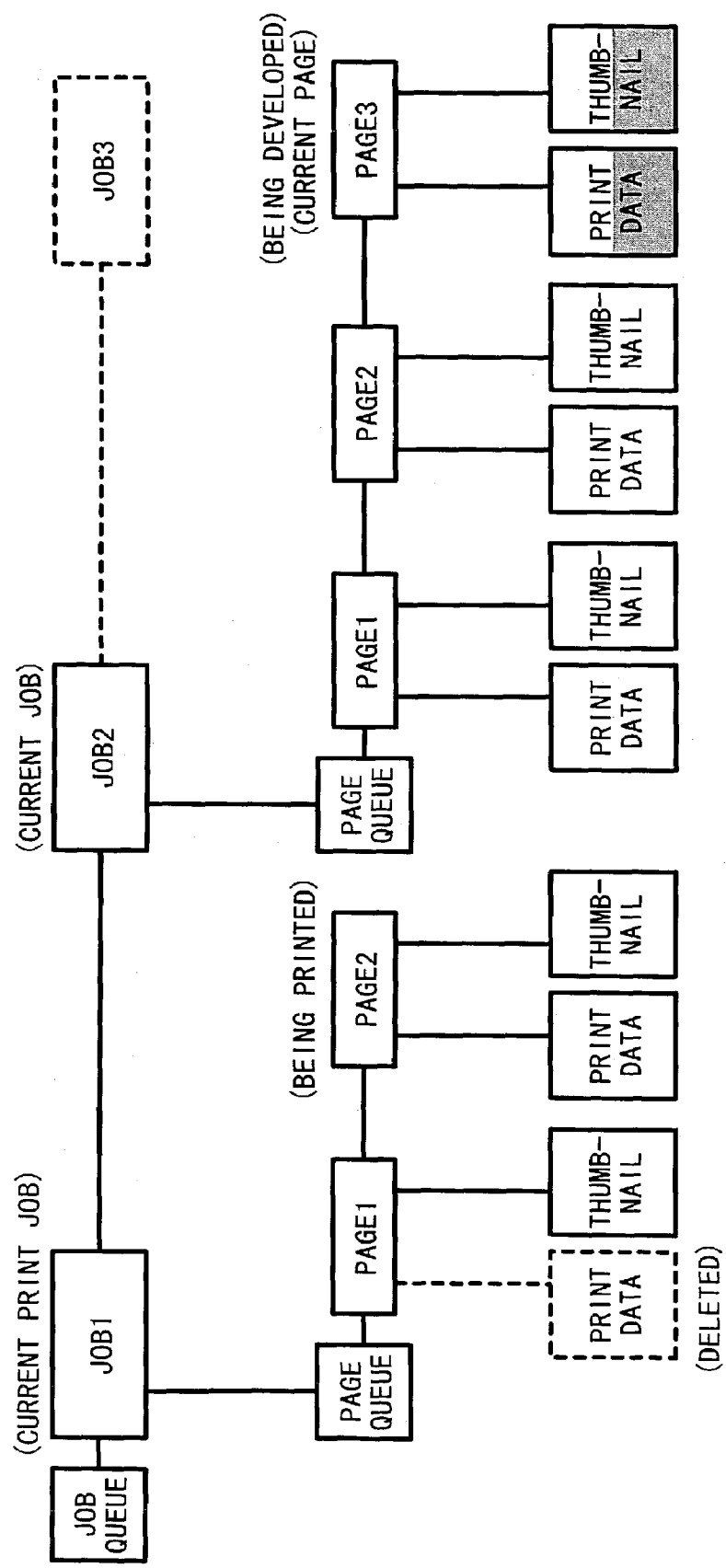
FIG. 4 is an explanatory diagram showing a structure of data to be stored in a data storage unit.

As a result, in the data storage unit 23, the job objects, the page objects, the print data, and the thumbnails are stored in the construction shown in FIG. 4.

Figure 5:
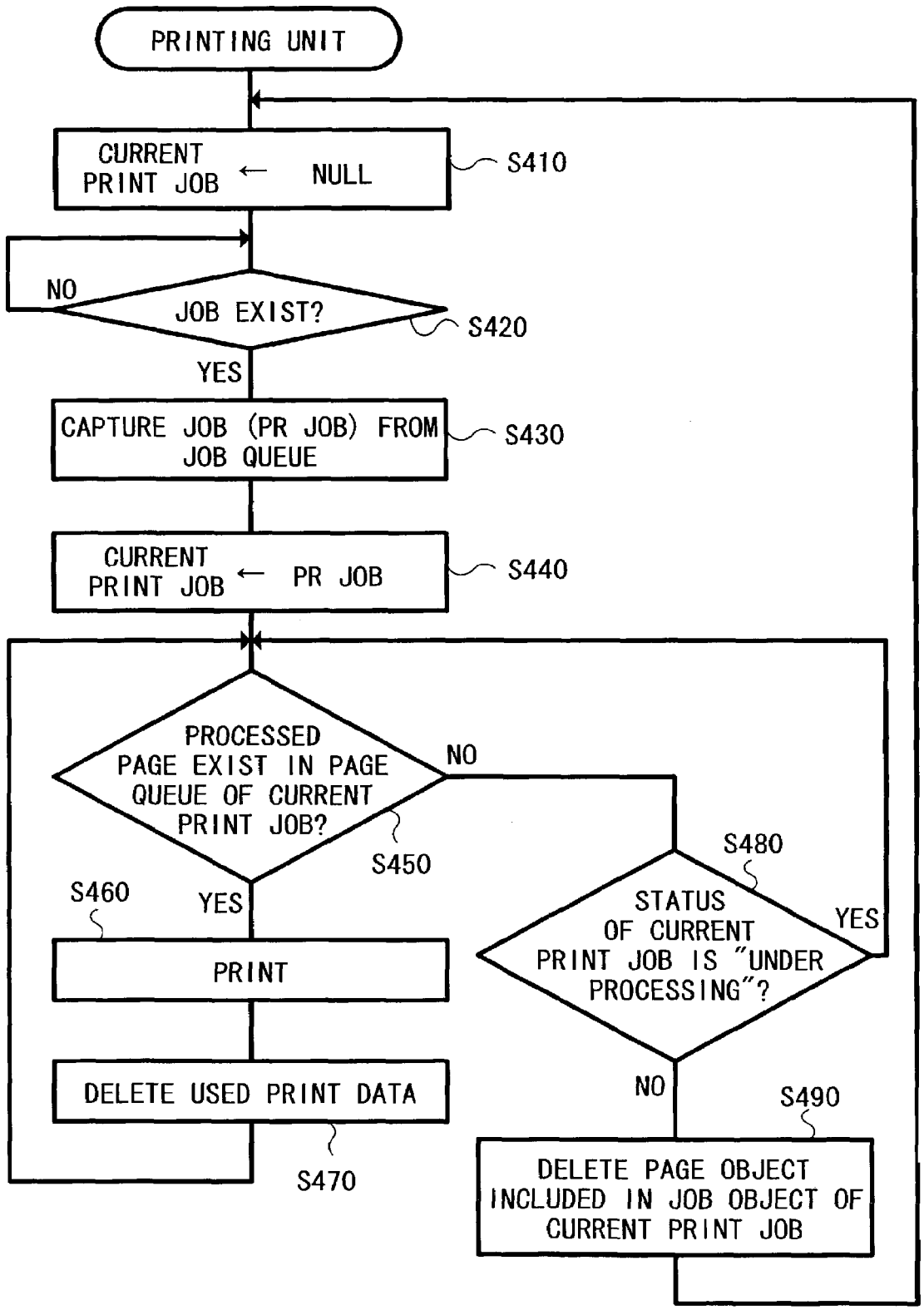
FIG. 5 is a flowchart showing processing to be executed by a printing unit.

The processing executed by the printing unit 24 will be described with reference to FIG. 5.

First, at S410, the setting of the current print job, which represents the job object being currently printed, is cleared (the setting of the current print job is assigned as null). Then, at S420, it is determined whether a job object has been added into the job queue. When it is determined that no job object has been added (S420:NO), the processing of S420 is repeatedly performed until an affirmative judgment is made at S420.

When it is determined that a job object has been added into the job queue (S420:YES), flow moves to S430 to take out the job object (PR Job) from the head of the job queue. Then, at S440, the job object captured at S430 is assigned as a current print job (CPJ).

Next, at S450, it is determined whether there is a page object whose status is "processed", in the page queue of the current print job. When there is a page object whose status is "processed" (S450:YES), flow moves to S460.

At S460, a printing operation is performed by using print data assigned to the page object, whose status is "processed" and which has been firstly added into the page queue of the current print job. Then, at S470, the print data used for the printing operation of S460 is deleted from the page object, and then flow goes back to S450.

At S450, when there is no page object whose status is "processed" (S450:NO), flow moves to S480. At S480, it is determined whether the status of the current print job is "under processing", that is, the processing for developing data into print data is being executed. When the status of the current print job is "under processing" (S480:YES), flow goes back to S450.

When the status of the current print job is not "under processing" (S480:NO), it is determined that all of the processing of the printing operation for the current print job has been completed. Therefore, flow moves to S490 to delete the job object, which is the current print job (CPJ), from the job queue. The page object containing a thumbnail under the deleted job object are also deleted. After that, flow goes back to S410.

That is, by performing the above-described processing, as shown in FIG. 4, the job object (Job1) added into the head of the job queue is assigned as a current print job. In the page queue of the current print job, only the print data of the page object (Page1), which was added into the page queue of the current print job before the page object being currently printed (Page2) was added thereto, are deleted. At the point where the printing operation for all the page objects added into the page queue is completed, the current print job, is deleted from the job queue. By doing so, a job object, which becomes the head of the job queue, is assigned as a current print job.

When the status of the current print job is "under processing" (S480:YES), the printing operation will not be performed until the status of the current print job becomes "processed".

Figure 6:
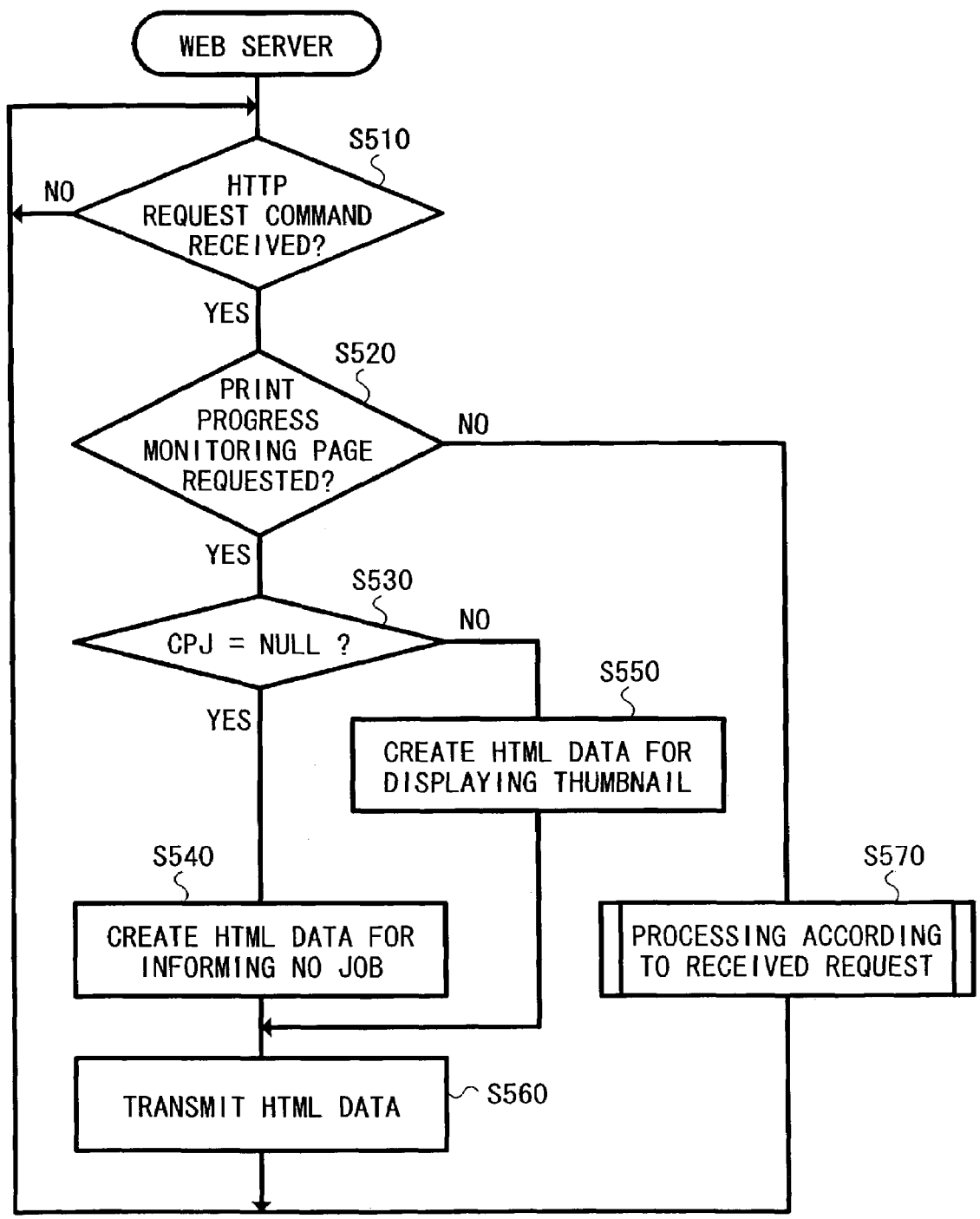
FIG. 6 is a flowchart showing processing to be executed by a Web server.

Next, the processing performed by the Web server 25 will be described with reference to FIG. 6.

As the Web server 25 starts the processing, first, at S510, it is determined whether an HTTP request command has been received. When the command has not been received (S510:NO), the processing of S510 is repeatedly performed until the command is received. When it is determined that the command has been received (S510:YES), flow moves to S520. At S520, it is determined whether a URL, which is included in the received HTTP request command, specifies a print progress monitoring page. When the URL does not specify the print progress monitoring page (S520:NO), flow moves to S570. At 570, the processing is performed according to the received command, and then, flow goes back to S510.

At S520, when it is determined that the URL specifies the print progress monitoring page (S520:YES), flow moves to S530. At S530, it is determined whether the setting of the current print job (CPJ) has been cleared (the setting of the current print job is assigned as null). When the setting has been cleared (S530:YES), flow moves to S540. At S540, HTML data for informing of no jobs is created, and then, flow moves to S560. When the setting has not been cleared (S530:NO), flow moves to S550. At S550, HTML data for indicating progress of the processing by thumbnails is created based on the thumbnail stored in the data storage unit 23. After that, flow moves to S560. A data file of the HTML data created at S550 is written with a command (META HTTP-EQUIV="Refresh" CONTENT=10) which performs automatic refresh at regular time intervals (for example, every 10 seconds).

At S560, the HTML data created at S540 or S550 is transmitted to the data processing terminal 10, which has sent the HTTP request command, and then flow goes back to S510.

The data processing terminal 10, which received the HTML data, displays a print progress monitoring page on the display by the Web browser 14. When the print progress monitoring page, which was created based on the HTML data created at S550, is displayed on the display, the Web browser 14 interprets the automatic refresh command, thereby refreshing the contents of the print progress monitoring page at the fixed time intervals.

Figure 7:
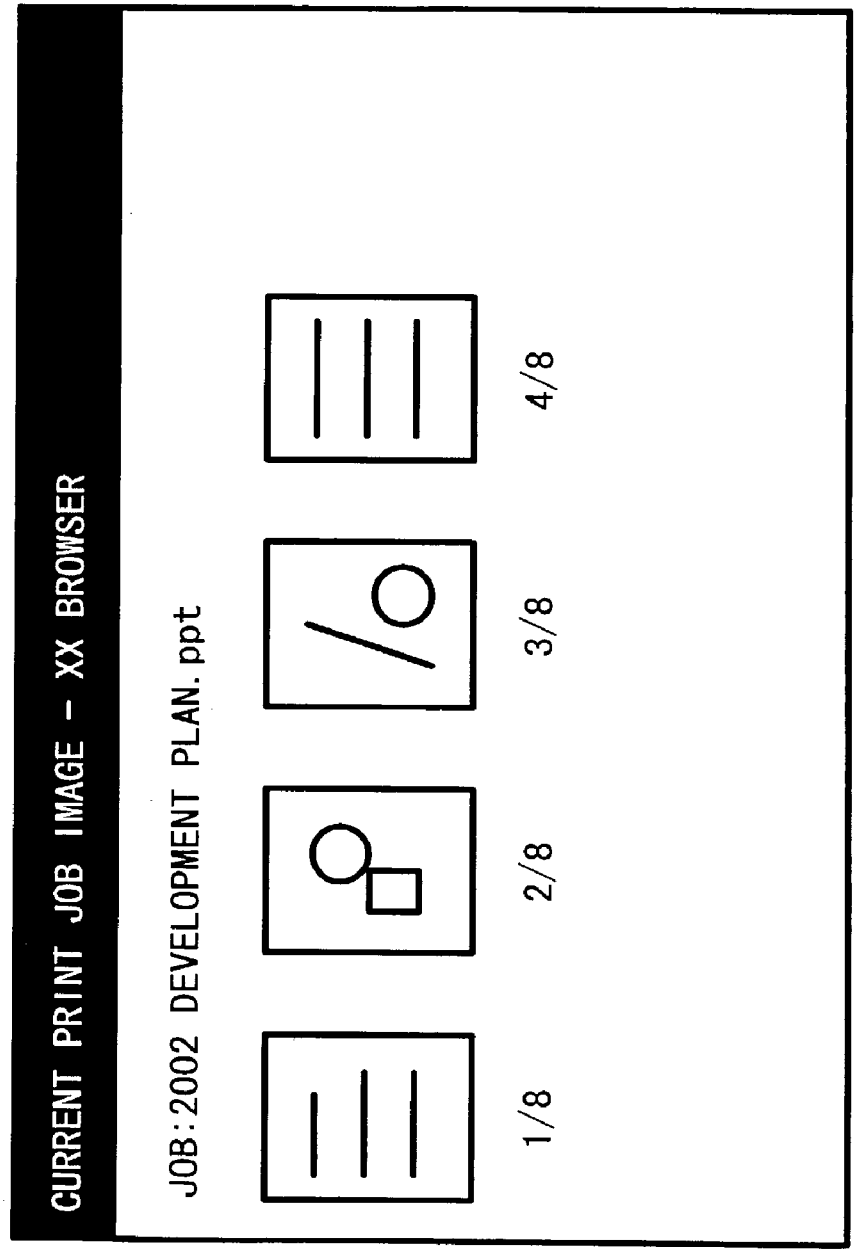
FIG. 7 is an explanatory diagram showing a display sample of a print progress monitoring page.

FIG. 7 shows an example of the print progress monitoring page. In this embodiment, the print progress monitoring page shows print progress of a current print job by using thumbnails of pages which have already been printed.

For displaying the print progress monitoring page as described above, at S550, a data file is created so that thumbnails for page objects, whose print data has been deleted, are to be shown in the print progress monitoring page.

As described above, the user can confirm the progress of the printing operation being performed by the printer 20 by observing the thumbnails of the printed pages shown in the print progress monitoring page. Accordingly, the user can immediately confirm how much of the processing of the printing operation has been completed by observing the printed contents described by the thumbnails, in addition to the page numbers.

It is assumed that the user desires to cancel a current print job at a certain point where the printing of necessary pages of the current print job are completed because it takes a lot of time to print all of the pages of the current print job. If the above-described case happens, then the user can determine an appropriate timing for canceling the printing operation.

In addition, a thumbnail, which has a smaller volume of data than print data, is used to display the print progress on the print job monitoring page. The print data, which has a larger volume of data, is deleted when the printing operation for the print job is completed. Accordingly, the storage capacity of the printer 20 can be effectively used.

In the embodiment, the command for automatically refreshing the Web page by the Web browser 14 is written in the data file for displaying the print progress monitoring page. Therefore, once the display of the print progress monitoring page is requested, the print progress of a current print job on the print progress monitoring page is automatically refreshed at all times. Thus, when the user needs to monitor the print progress for a while, it is not necessary for the user to repeatedly request for refresh of the print progress monitoring page. Thus, the print progress monitoring page has usability.

Next, a second embodiment according to the invention will be described below. The second embodiment is similar to the first embodiment, except the time at which the creation of a thumbnail is started. Because of this difference, the processing to be executed by the data processing unit 22, the printing unit 24 and the Web server 25 of the printer 20 are partially different from those of the first embodiment. Explanations for the similar parts will be omitted and only those different parts will be described below with reference to FIGS. 8 to 11.

In this embodiment, a thumbnail is created after print target data of a print job is developed into print data in bitmap format. That is, the thumbnail is not created concurrently with the development of the print target data into the print data, but is created only after an HTTP request command is received from the data processing terminal 10.

Figure 8:
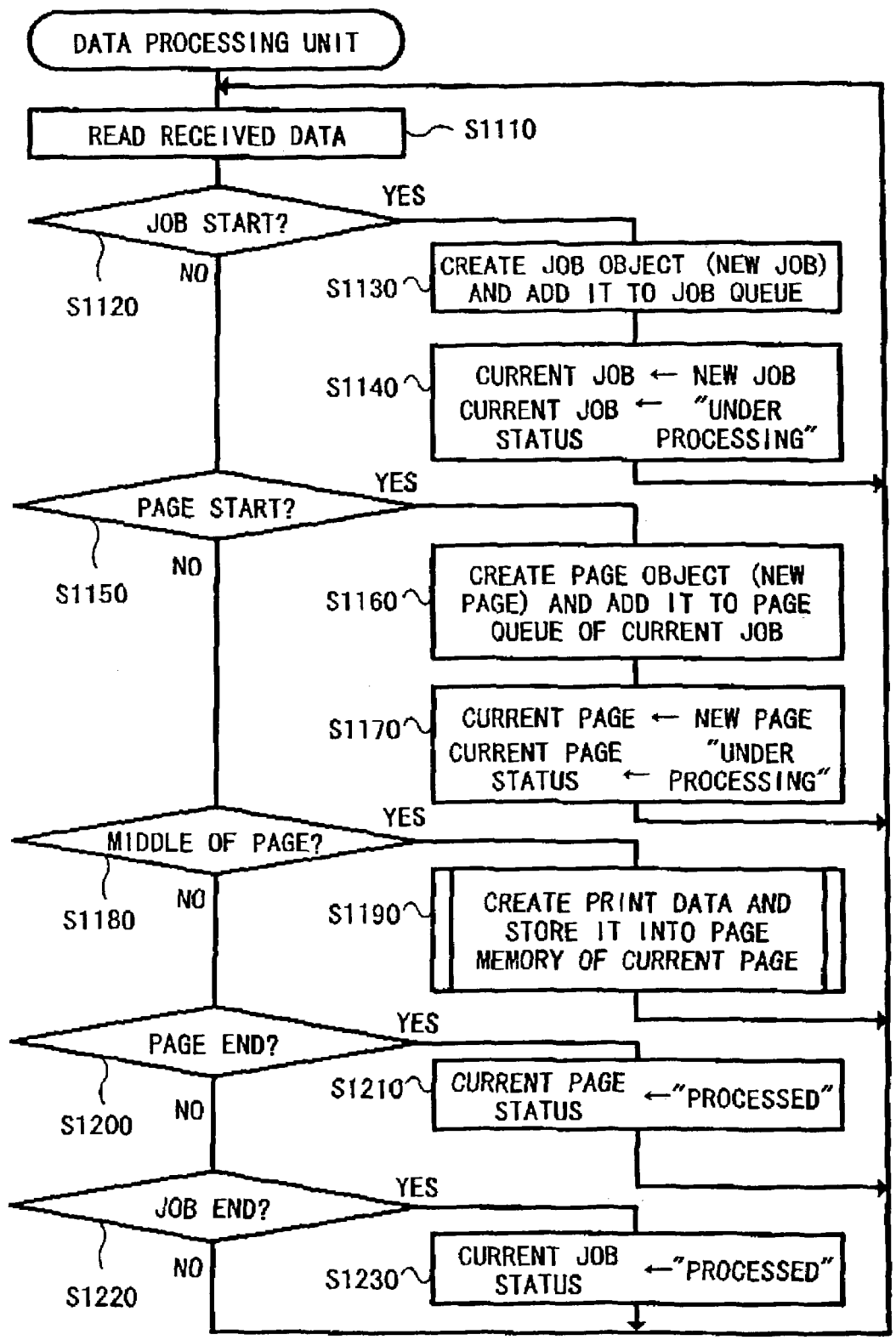
FIG. 8 is a flowchart showing processing to be executed by the data processing unit according to a second embodiment.
Figure 11:
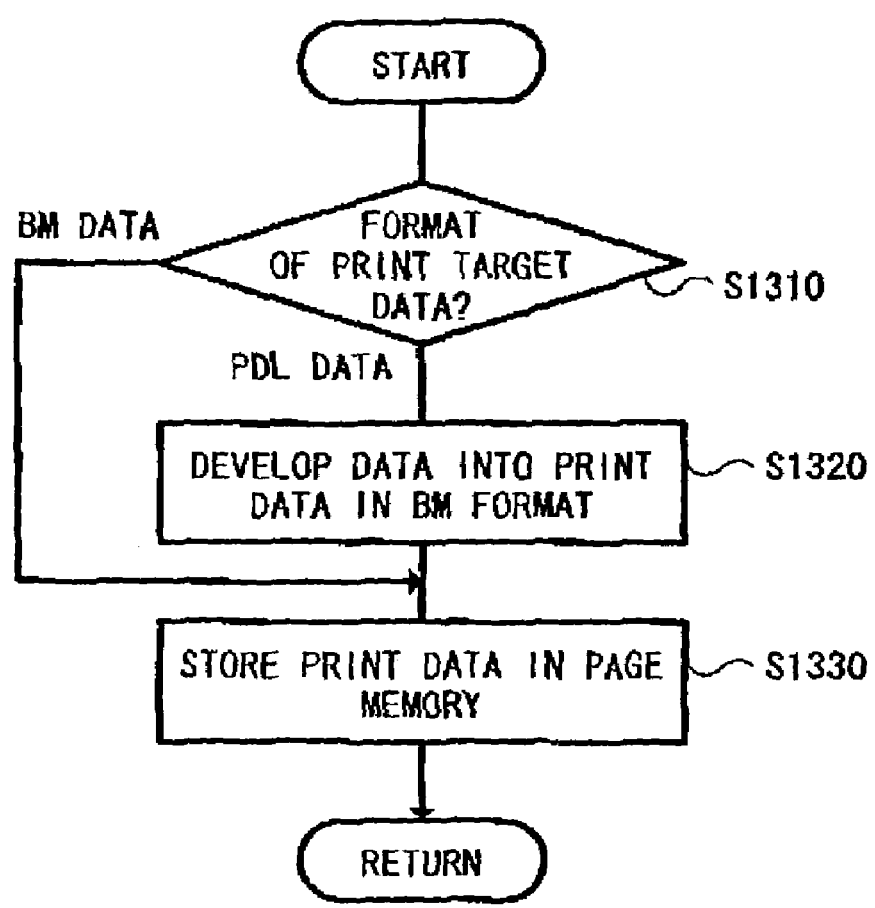
FIG. 11 is a flowchart showing details of processing of S1190 according to the second embodiment.

Referring to FIGS. 8 and 11, the processing to be performed by the data processing unit 22 will be described. Only the processing of S1190 of FIG. 8 is different from the processing executed by the data processing unit 22 of FIG. 2 of the first embodiment. At S1110, data is read from the receiving buffer. After that, when a negative judgement is made at S1120 and S1150 and an affirmative judgement is made at S1180, flow moves to S1190. At S1190, only print data is created based on the read data, and then stored in the page memory 23a for current pages. At this point, a thumbnail is not created. After S1190, flow goes back to S1110.

The processing of S1190 will be described in detail with reference to FIG. 11. Because the thumbnail of the print data is not created at this point, processing is to be performed only on the print data. The processing of S1310 to S1330 of FIG. 11 are the same as the processing of S310 to S330 of FIG. 3 of the first embodiment, respectively. When the data is in the PDL format (S1310:PDL data), the data is developed into BM data at S1320, and then, is stored in the page memory 23a for the current page at S1330. When the data is in the BM format (S310:BM data), flow moves to S1330 to store the data in the page memory 23a. After S1330, flow goes back to S1110.

Figure 9:
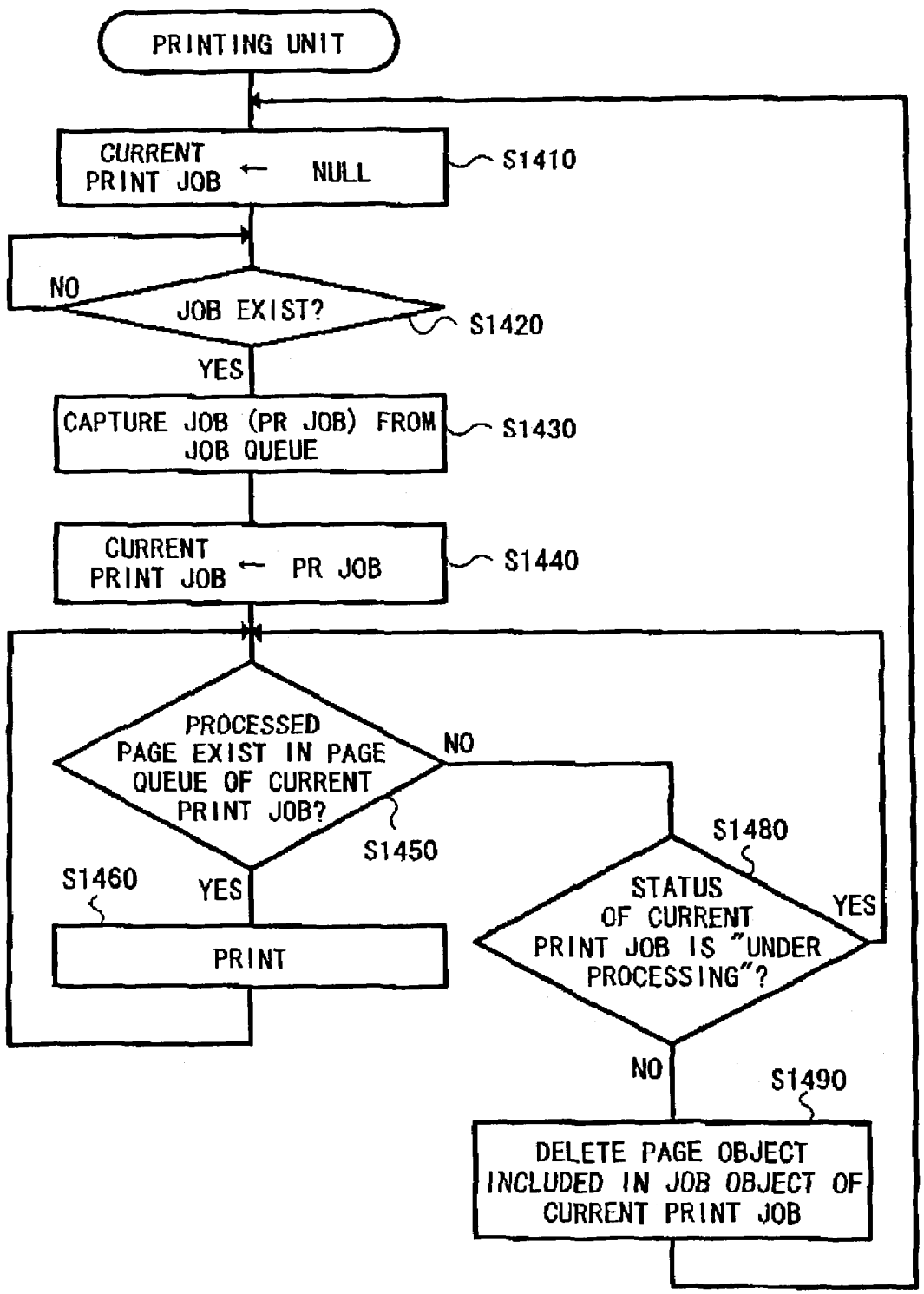
FIG. 9 is a flowchart showing processing to be executed by the printing unit according to the second embodiment.

The processing to be executed by the printing unit 24 will be described with reference to FIG. 9. In the first embodiment, the print data used for the printing operation is deleted from the page object at S470 immediately after the printing operation of the print data is completed at S460. However, in the second embodiment, the print data used for the printing operation is not deleted immediately after the printing operation of the print data at S1460 is completed. After S1460, flow goes back to S1450 with the print data, which has been used for the printing operation, being left in its page object. When a negative judgement is made at S1450 and S1480, that is, it is determined that all of the processing of the printing operation for the current print job has been completed, flow moves to S1490 to delete the job object, which is the current print job, from the job queue. Thus, the page object containing the print data and thumbnail under the deleted job object are also deleted. After that, flow goes back to S1410. Other processing executed by the printing unit 24 of the second embodiment is the same as the processing executed by the printing unit 24 of the first embodiment.

Figure 10:
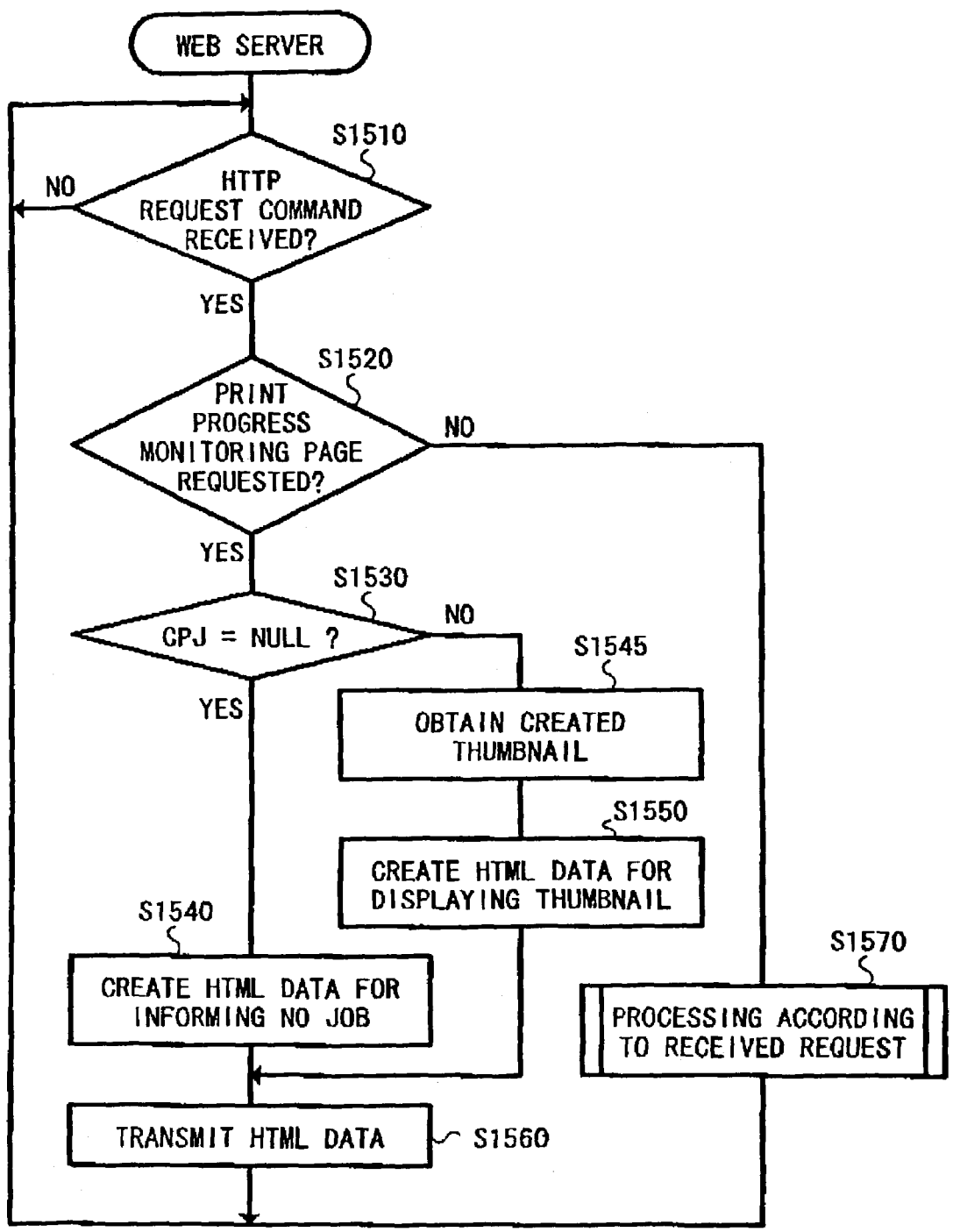
FIG. 10 is a flowchart showing processing to be executed by the Web server according to the second embodiment.

The processing executed by the Web server 25 will be described with reference to FIG. 10. This processing is basically similar to the processing executed by the Web server 25 of the first embodiment of FIG. 6, except that a case where HTML data for indicating print progress of a current print job by thumbnails is created is partially different from that of the first embodiment. Only this case will be described below.

At S1510, it is determined whether an HTTP request command has been received. When it is determined that the command has been received (S1510:YES), flow moves to S1520. Then, when the command received at S1510 is a request of a print progress monitoring page (S1520:YES) and the setting of the current print job (CPJ) has not been cleared (S1530: NO), flow moves to S1545. At S1545, the Web server 25 obtains thumbnails, which are created by the data processing unit 22 based on the print data, to create HTML data for indicating progress of the current print job by thumbnails at S1550. After that, at S1560, the created HTML data is transmitted to the data processing terminal 10, which has sent the HTTP request command, and then flow goes back to S1510. As described above, the thumbnails are created after the HTTP request command is received from the data processing terminal 10, and then the created thumbnails are used to create the HTML data, unlike the first embodiment using thumbnails created and stored in the thumbnail memory 23b in advance.

In the printing system 1 constructed as the second embodiment, the same effects as the first embodiment can also be obtained. Further, only when an HTTP request command is received from the data processing terminal 10, thumbnails are created by the printer 20. Accordingly, the burden on the printer 20 can be reduced.

Figure 12A:
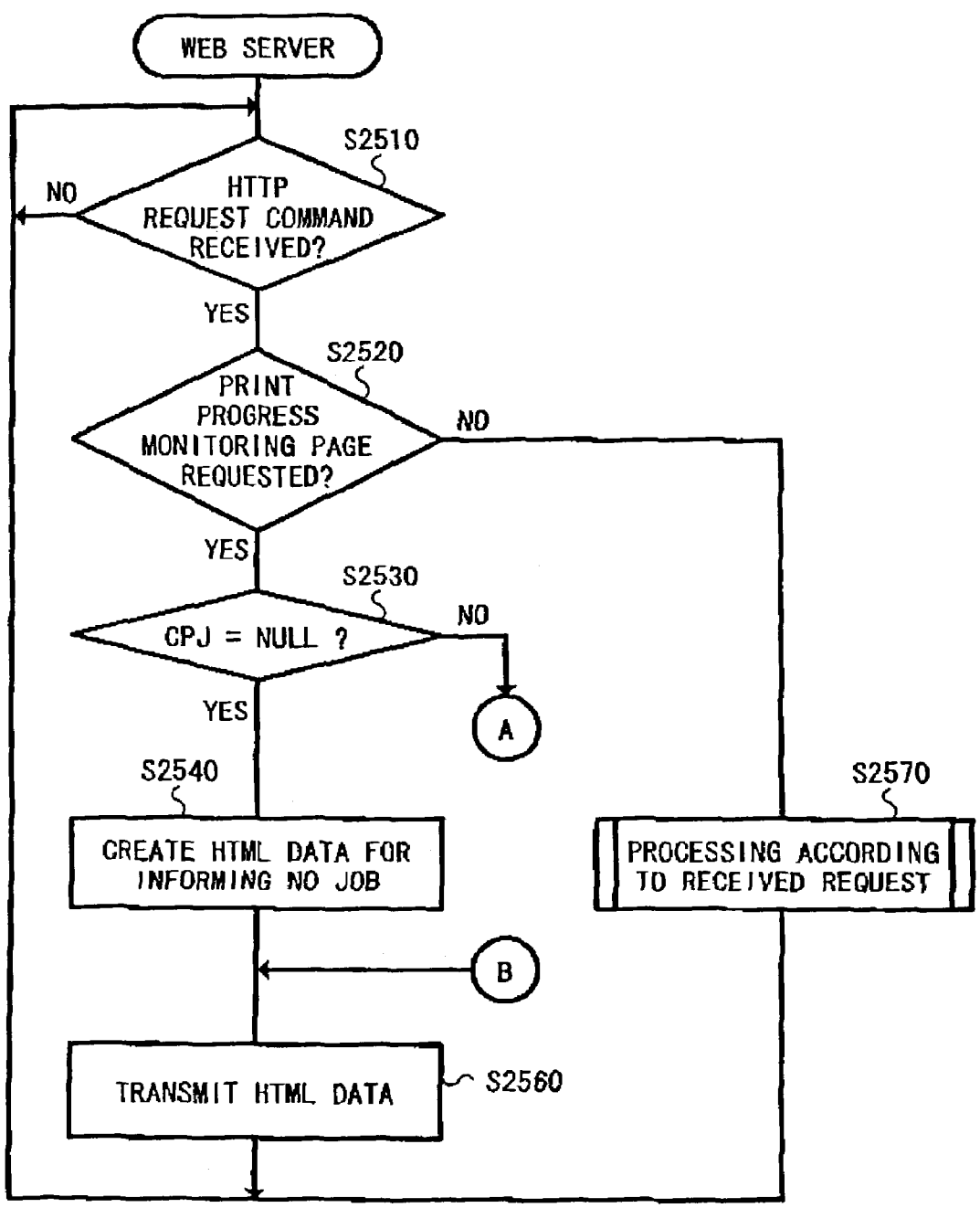
FIG. 12A is a flowchart showing processing to be executed by the Web server according to a third embodiment.
Figure 12B:
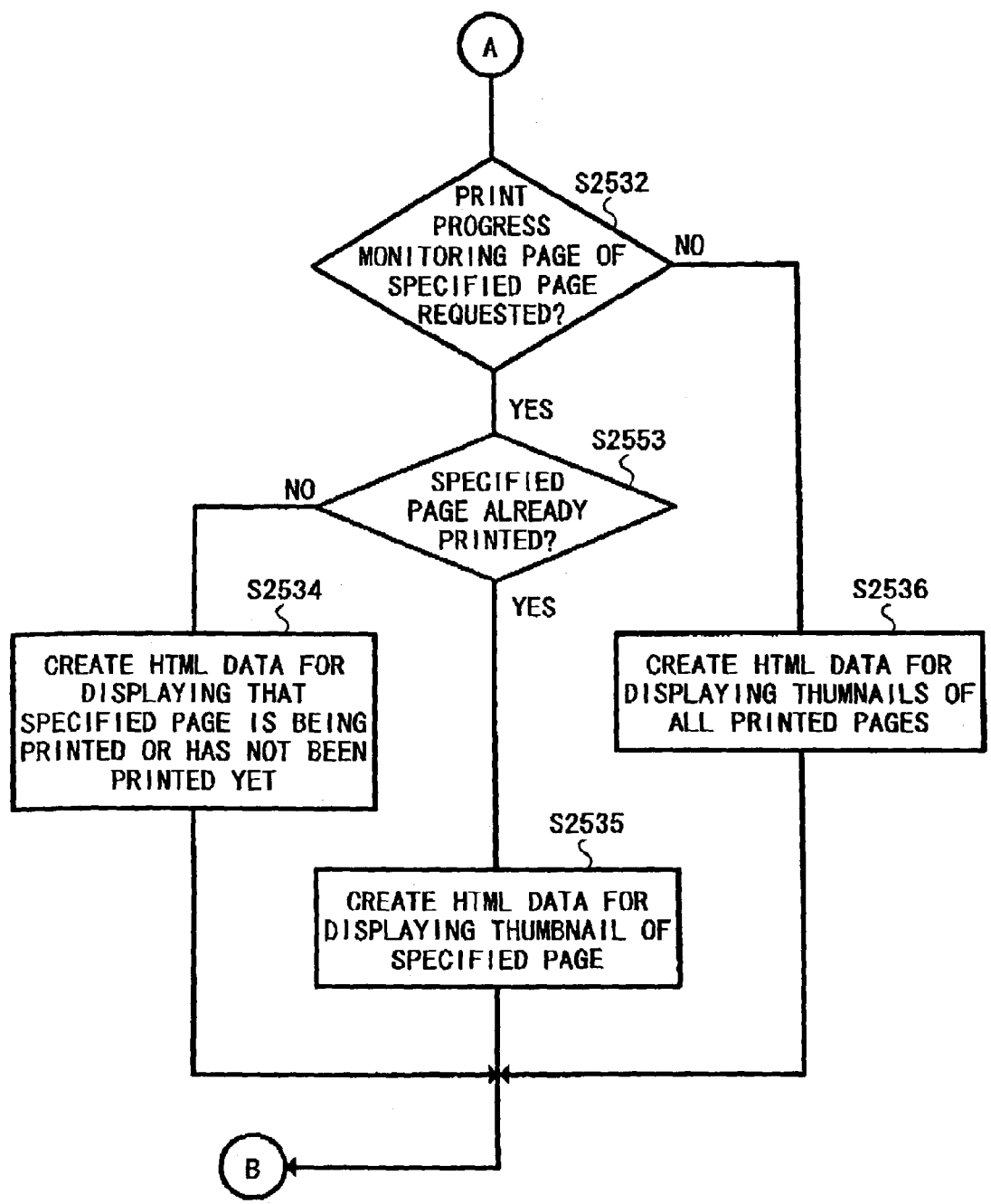
FIG. 12B is a continuation of the flowchart of FIG. 12A.

Next, a third embodiment according to the invention will be described below. The third embodiment is similar to the first embodiment, except that the Web server 25 of the third embodiment can create HTML data for indicating progress of processing of a specified page by a thumbnail. Explanations for the similar parts will be omitted and only the different parts will be described below with reference to FIGS. 12A and 12B.

At S2510, it is determined whether an HTTP request command has been received. When it is determined that the command has been received (S2510:YES), flow moves to S2520. Then, when the HTTP request command received at S2510 is a request of a print progress monitoring page (S2520:YES) and the setting of the current print job (CPJ) has not been cleared (S2530:NO), flow moves to S2532 of FIG. 12B.

At S2532, it is determined whether a print progress monitoring page of a specified page is requested. When a print progress monitoring page of a specified page is not requested (S2532:NO), flow moves to S2536. At S2536, HTML data for indicating print progress of a current print job by thumbnails is created based on the thumbnails stored in the thumbnail memory 23b. That is, HTML data for indicating all of the pages, which have already been printed, by thumbnails is created in a similar manner to the first embodiment. After that, flow moves to S2560 of FIG. 12A.

When a print progress monitoring page of a specified page is requested (S2532:YES), flow moves to S2553. At S2553, it is determined whether the specified page has already been printed by referring to the presence or absence of print data included in a page object of the specified page. Similar to the first embodiment, when print data for a page has been deleted from its page object, it is determined that the page has already been printed. When print data for a page is still left in its page object, it is determined that the page has not been printed yet. When it is determined that the specified page has already been printed (S2553:YES), flow moves to S2535. At S2535, HTML data for indicating progress of the processing of the specified page by a thumbnail is created. Then, flow moves to S2560 of FIG. 12A to transmit the created HTML data to the data processing terminal 10, which has sent the HTTP request command.

When, at S2553, it is determined that the specified page has not been printed yet (S2553:NO), flow moves to S2534. When the specified page is being printed, also, a negative judgement is made at S2553 and flow moves to S2534. At S2534, HTML data for displaying that the specified page is being printed or has not been printed yet is created on the data processing terminal 10. After that, flow moves to S2560 of FIG. 12A to transmit the created HTML data to the data processing terminal 10, which has sent the HTTP request command.

According to the third embodiment of the invention, the user can confirm progress of processing of a desired page by specifying the desired page by the data processing terminal 10.

Next, a fourth embodiment according to the invention will be described below. The fourth embodiment is similar to the first embodiment, except the format of a print request (print job) to be transmitted from the data processing terminal 10 to the printer 20, and processing to be executed by the data processing unit 22 of the printer 20 are partially different from those of the first embodiment. Therefore, those different parts will be described below with reference to FIGS. 13A and 13B.

In this embodiment, the file creating application 13 installed in the data processing terminal 10 creates not only print target data but also a thumbnail (preview data), which shows a print image when a printing operation is performed by using the print target data. When the data processing terminal 10 requests the printer 20 to perform a printing operation, the data processing terminal 10 transmits the print target data, which includes the thumbnail, to the printer 20.

The thumbnail is included in the print target data as described below. First, the print target data is divided into a plurality of parts (PD1, PD2, PD3, . . . ) (hereinafter, referred to as partial print target data). The thumbnail is also divided into a plurality of parts (SD1, SD2, SD3, . . . ) (hereinafter, referred to as partial preview data) so as to correspond to the respective partial print target data. Then, each of the partial preview data is inserted between the plurality of the partial print target data so that each of the partial preview data is associated with the immediately preceding partial print target data or the immediately following partial print target data.

Figure 13A:
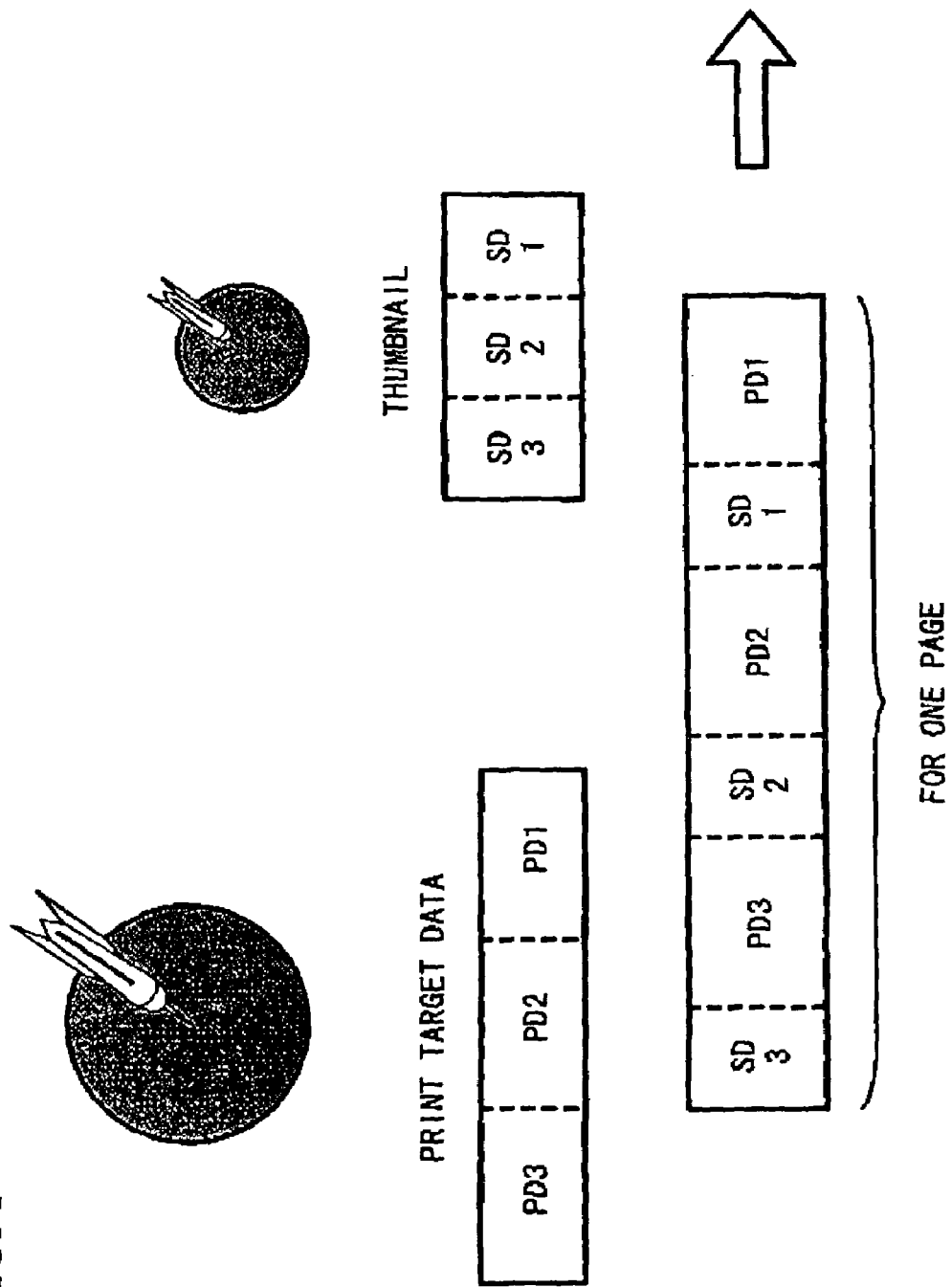
FIGS. 13A and 13B are explanatory diagrams showing descriptions of a print request to be made by a data processing terminal according to a fourth embodiment.
Figure 13B:
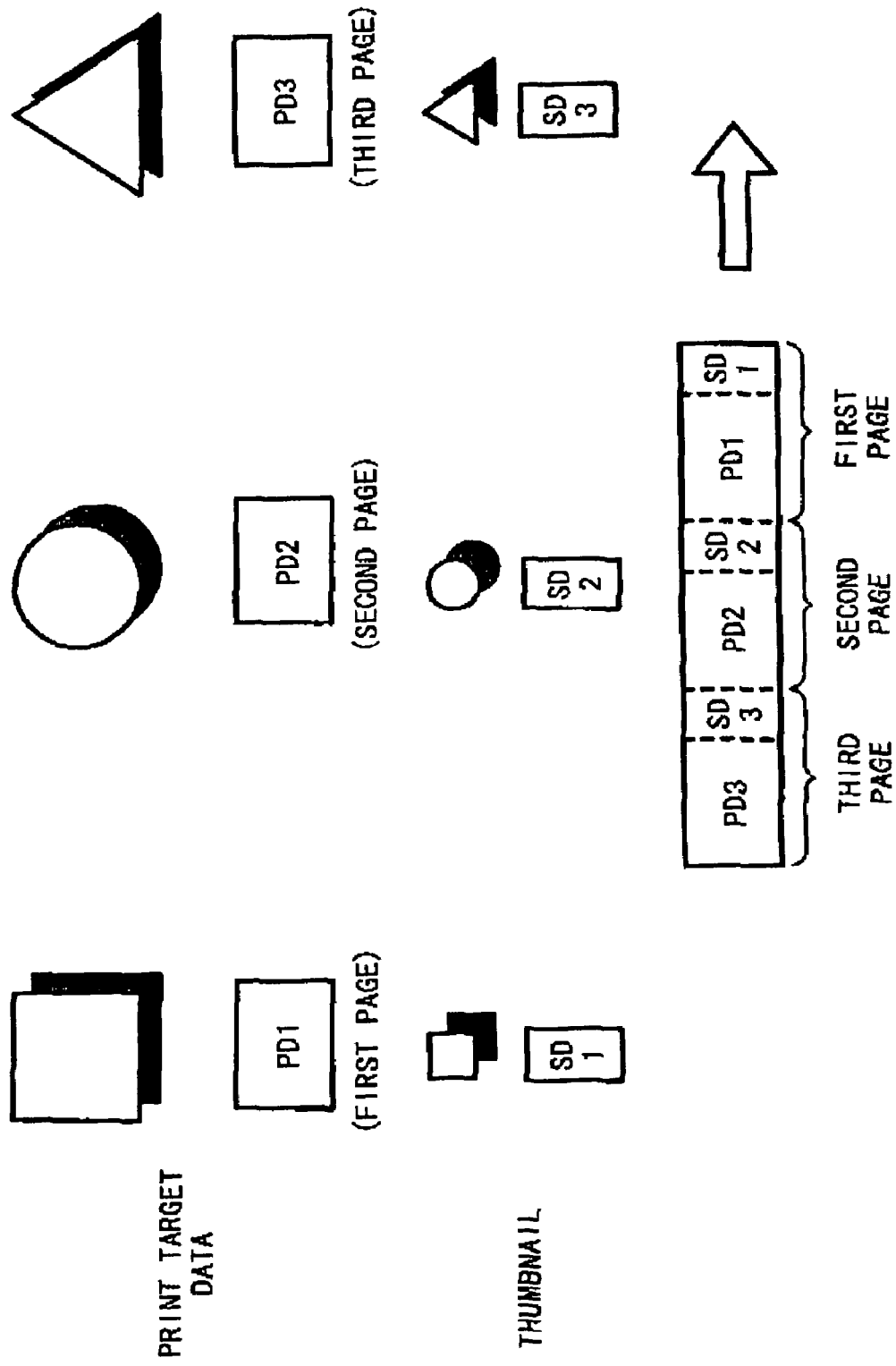

The print target data and the thumbnail can be divided into a plurality of data such that each page is divided into a plurality of parts as shown in FIG. 13A. Alternatively, the print target data and the thumbnail can be divided into a plurality of data by page as shown in FIG. 13B.

In the processing executed by the data processing unit 22 of the printer 20, only the procedure of the processing of S190 is different from that of the processing of S190 of the first embodiment.

Figure 14:
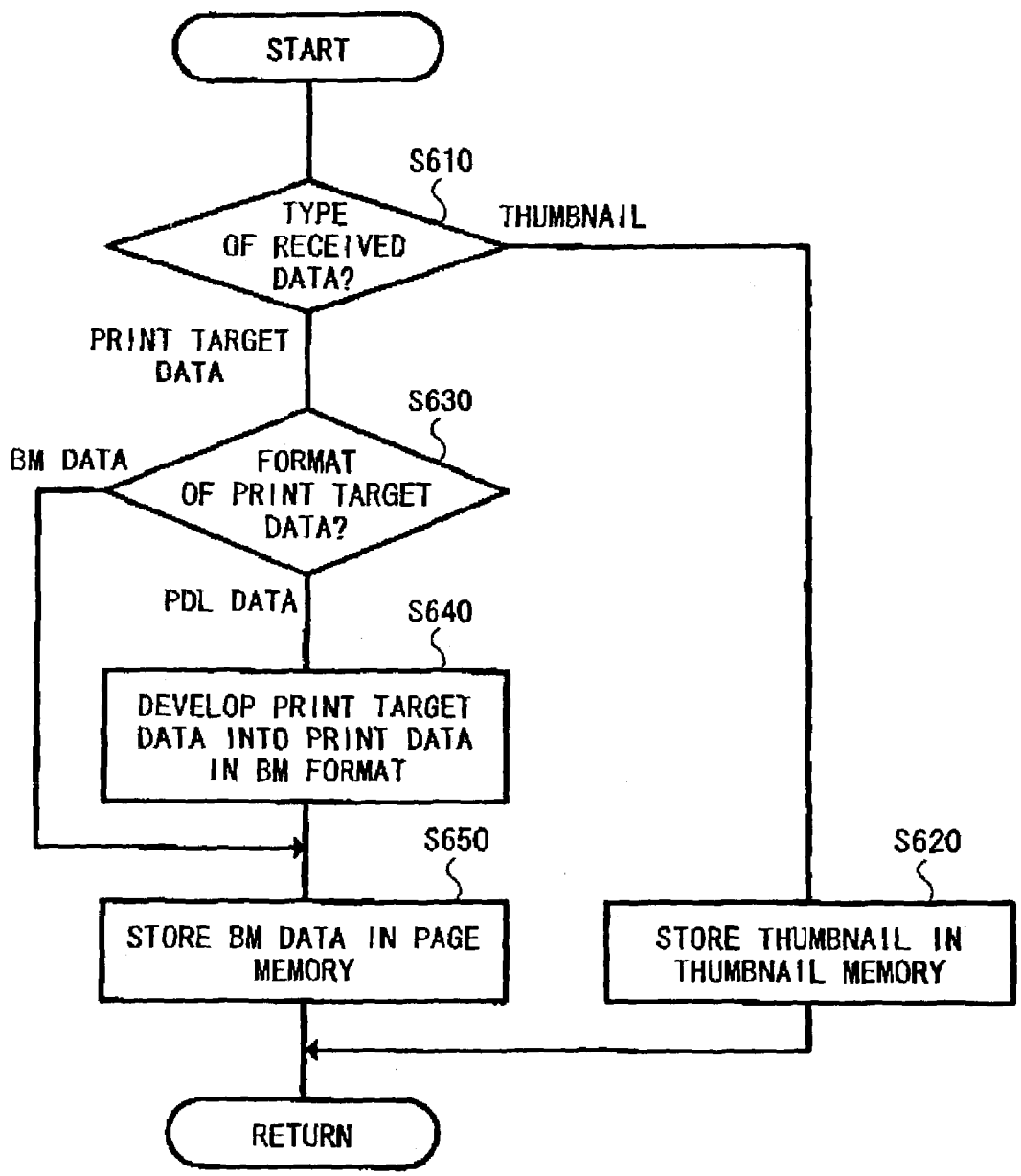
FIG. 14 is a flowchart showing details of processing of S190 according to the fourth embodiment.

The detail procedure of the processing of S190 of the second embodiment will be described with reference to FIG. 14.

First, at S610, it is determined whether the read data is print target data or a thumbnail. When the read data is a thumbnail (S610:thumbnail), flow moves to S620. At S620, the thumbnail is stored in the thumbnail memory 23b of the current page, and then flow moves to S110 of FIG. 2.

When the read data is print target data (S610:print target data), flow moves to S630. At S630, it is determined whether the read data is in the PDL format or in the BM format. When the data is in the PDL format (S630:PDL data), flow moves to S640. At S640, the print target data is developed into BM data. Then, at S650, the BM data is stored in the page memory 23a of the current page, as print data, and flow moves to S110 of FIG. 2. When it is determined that the read data is in the BM format (S630:BM data), the print target data is stored in the page memory 23a of the current page, as it is, as print data, at S650. Then, flow moves to S110 of FIG. 2.

In the printing system 1 constructed as the fourth embodiment, also, the same effects as the first embodiment can be obtained. Further, the printer 20 is not required to create a thumbnail, so that the burden on the printer 20 can be reduced.

In the above-described embodiments, the printer 20 includes the Web server 25 therein. However, a Web server can be provided separately from a printer. In this case, the Web server makes an inquiry to the printer in response to a request for the print progress monitoring page received from the data processing terminal 10. Then, the Web server creates a data file for displaying the print progress monitoring page by using the result of the inquiry.

In the above-described embodiments, only print progress of the current print job is displayed. However, it can be designed such that a job object is specified by an HTTP request command and the print progress of the specified job object is displayed.

Further, the print progress monitoring page shows thumbnails for pages which have already been printed. However, the print progress monitoring page may display thumbnails for pages which have been developed into print data.

According to the embodiments of the invention, the Web server 25 of the printer 20 not only performs the printing operation according to a received print job, but also provides a Web page showing print progress of the print job in response to a request for the Web page from the data processing terminal 10.

That is, the printer 20 has a unified structure of the printer 20 and the Web server 25, which constitutes the printing system 1. By using the printer 20 with the data processing terminal 10 including the Web browser 14, the desired print progress of the pint job being executed by the certain printer 20 can be confirmed by browsing the Web page using a universal method regardless of the types of the printers.

Print progress of a print job being printed is shown by a Web page provided by the Web server 25. The Web page includes information showing portions which have been already printed onto a recording medium.

Accordingly, in the printer 20, the user can immediately confirm the print progress of how much of the printing operation has been completed in the page being printed, in addition to a page number.

In the printer 20, a thumbnail of a print result is created based on a print job. The Web server 25 provides a Web page showing print progress of the print job using the created thumbnail.

By displaying the thumbnail with the print progress, the user can immediately confirm how much of the printing operation has been completed, that is, how many pages of which contents of the data have been completed. For example, when the user desires to cancel a print job being printed at the point when the printing of necessary pages has been completed because it takes a lot of time to complete the print job, the user can determine an appropriate timing for canceling the print job by viewing the thumbnail, which shows a page that has been already printed.

Without using a thumbnail, a similar Web page can be provided by using print data only. In this case, however, print data, which has been already printed, cannot be deleted until the printing operation of all of the data of the print job is completed. -If a thumbnail is used as in the embodiments of the invention, print data, which becomes unnecessary, can be deleted one after another. Therefore, a large capacity is not needed.

In the printer 20, print target data of a print job is developed into print data in the BM format concurrently with the creation of a thumbnail.

The thumbnail does not need to be created by the printer 20. For example, print job may include a thumbnail showing an image of a print result according to the print job and print target data. In this case, the Web server 25 provides a Web page which shows print progress of the print job using the thumbnail included in the print job.

If a Web page provides print progress of a print job only at the time of accessing the printer 20, the user needs to repeatedly access the printer 20 to obtain the latest print progress in order to monitor the print progress continuously. However, the user may find this operation burdensome.

In order to solve this problem, in the above-described embodiments, the data file for displaying a Web page provided by the Web server 25 is written with the command of automatically refreshing the Web browser 14.

Accordingly, once the Web page is displayed, the Web page is automatically refreshed to show the latest print progress. Therefore, the convenience can be improved.

The computer program for operating the printer 20 can be stored in a computer-readable recording medium, such as a floppy disk, magnet-optical disc, DVD, CD-ROM, hard disk, or memory card. The program can be loaded from the recording medium into a computer system and run as necessary. The program can be also stored in other computer-readable recording medium, such as a ROM or a backup RAM. In this case, the ROM or backup RAM is installed in the computer system in order to use the program. Further, the computer program may not necessarily be stored in the recording medium, but can be loaded into the computer system via a network.

While the invention has been described in detail and with reference to the specific embodiments thereof, it would be apparent to those skilled in the art that various changes, arrangements and modifications may be applied therein without departing from the spirit and scope of the invention.

What is claimed is:

1. A printing apparatus that performs a printing operation based on a print job, the printing apparatus comprising:
   a data processing unit that creates a job object for the print job and a page object for each page in the print job and each page object includes at least a pointer that points to a corresponding page memory, which stores print data for each page, and a corresponding thumbnail memory;
   a thumbnail creating unit that creates a thumbnail for each page to be printed by the print job and the thumbnail is stored in the corresponding thumbnail memory; and
   a Web page providing unit that provides a Web page in response to a request from a Web browser for browsing the Web page and the Web page shows a progress of the print job being performed by the printing apparatus by displaying at a same time the thumbnails of printed pages, which correspond to the print data of each corresponding page object,
   wherein the print data stored in the page memory that is pointed to by the corresponding page object is deleted by the data processing unit upon completion of printing of each page, and the corresponding thumbnail remains on the Web page.

2. The printing apparatus according to claim 1, further comprising a developing unit that develops a print target data of the print job into the print data in bitmap format, wherein the thumbnail creating unit performs the creation of the thumbnail after the development of the print target data into the print data by the developing unit.

3. The printing apparatus according to claim 1, further comprising a developing unit that develops a print target data of the print job into the print data in bitmap format, wherein the thumbnail creating unit performs the creation of the thumbnail concurrently with the development of the print target data into the print data by the developing unit.

4. The printing apparatus according to claim 1, wherein the Web page providing unit creates a data file for displaying the Web page, wherein the data file is written with a command for automatically refreshing the Web page by the Web browser.

5. A printing system, comprising:
   a printing apparatus that performs a printing operation based on a print job;
   a data processing terminal that includes a Web browser for browsing a Web page;
   a data processing unit that creates a job object for the print job and a page object for each page in the print job and each page object includes at least a pointer that points to data corresponding page memory, which stores print data for each page, and a corresponding thumbnail memory;
   a thumbnail creating unit that creates a thumbnail for each page to be printed by the print job and the thumbnail is stored in the corresponding thumbnail memory; and
   a Web server that provides the data processing terminal with the Web page, which shows a progress of the print job being performed by the printing apparatus by displaying at a same time the thumbnails of printed pages, which correspond to the print data of each corresponding page object,
   wherein the print data stored in the page memory that is pointed to by the corresponding page object is deleted by the data processing unit upon completion of printing of each page, and the corresponding thumbnail remains on the Web page.

6. A computer readable medium storing a computer program used for a printing apparatus that performs a printing operation based on a print job, comprising:
   a function of creating a job object for the print job and a page object for each page in the print job and each page object includes at least a pointer that points to a corresponding page memory, which stores print data for each page, and a corresponding thumbnail memory;
   a function of creating a thumbnail for each page to be printed by the print job and the thumbnail is stored in the corresponding thumbnail memory; and
   a function of providing a Web page in response to a request from a Web browser for browsing the Web page, which shows a progress of the print job being performed by the printing apparatus by displaying at a same time the thumbnails of printed pages, which correspond to the print data of each corresponding page object;
   wherein the print data stored in the page memory that is pointed to by the corresponding page object is deleted upon completion of printing of each page, and the corresponding thumbnail remains on the Web page.

7. A printing apparatus that performs a printing operation based on a print job, comprising:
- a means for creating a job object for the print job and a page object for each page in the print job and each page object includes at least a pointer that points to a corresponding page memory, which stores print data for each page, and a corresponding thumbnail memory;
- a means for creating a thumbnail for each page to be printed by the print job and the thumbnail is stored in the corresponding thumbnail memory; and
- a means for providing a Web page in response to a request from a Web browser for browsing the Web page, which shows a progress of the print job being performed by the printing apparatus by displaying at a same time the thumbnails of printed pages, which correspond to the print data of each corresponding page object,
- wherein the print data stored in the page memory that is pointed to by the corresponding page object is deleted upon completion of printing of each page, and the corresponding thumbnail remains on the Web page.

8. The printing apparatus according to claim 7, further comprising a developing unit that develops a print target data of the print job into the print data in bitmap format, wherein the thumbnail creating unit performs the creation of the thumbnail after the development of the print target data into the print data by the developing unit.

9. The printing apparatus according to claim 7, further comprising means for developing a print target data of the print job into the print data in bitmap format, wherein the means for creating the thumbnail performs the creation of the thumbnail concurrently with the development of the print target data into the print data by the means for developing.

10. The printing apparatus according to claim 7, wherein the means for providing the Web page creates a data file for displaying the Web page, wherein the data file is written with a command for automatically refreshing the Web page by the Web browser.

11. A printing system, comprising:
- a printing apparatus that performs a printing operation based on a print job;
- a means for processing data that includes a Web browser for browsing a Web page;
- a means for creating a job object for the print job and a page object for each page in the print job and each page object includes at least a pointer that points to a corresponding page memory, which stores print data for each page, and a corresponding thumbnail memory;
- a means for creating a thumbnail for each page to be printed by the print job and the thumbnail is stored in the corresponding thumbnail memory; and
- a means for providing a Web page to the means for processing data in response to a request from the means for processing data, which shows a progress of the print job being performed by the printing apparatus, by displaying at a same time the thumbnails of printed pages, which correspond to the print data of each corresponding page object
- wherein the print data stored in the page memory that is pointed to by the corresponding page object is deleted upon completion of printing of each page, and the corresponding thumbnail remains on the Web page.

12. A computer readable medium storing a computer program used for a printing apparatus that performs a printing operation based on a print job, comprising:
- a means for creating a job object for the print job and a page object for each page in the print job and each page object includes at least a pointer that points to a corresponding page memory, which stores print data for each page, and a corresponding thumbnail memory;
- a means for creating a thumbnail for each page to be printed by the print job and the thumbnail is stored in the corresponding thumbnail memory; and
- a means for providing a Web page in response to a request from a Web browser for browsing the Web page, which shows a progress of the print job being performed by the printing apparatus, by displaying at a same time the thumbnails of printed pages, which correspond to the print data of each corresponding page object,
- wherein the print data stored in the page memory that is pointed to by the corresponding page object is deleted upon completion of printing of each page, and the corresponding thumbnail remains on the Web page.

13. A printing apparatus that performs a printing operation based on a specified page object, comprising:
- a means for creating a job object for the print job and a page object for each page in the print job and each page object includes at least a pointer that points to a corresponding page memory, which stores print data for each page, and a corresponding thumbnail memory;
- a means for creating a thumbnail for each page to be printed by the print job and the thumbnail is stored in the corresponding thumbnail memory; and
- a means for providing a Web page in response to a request from a Web browser for browsing the Web page, which shows a progress of the specified print object being performed by the printing apparatus by displaying at a same time the thumbnails of printed pages, which correspond to the print data of each corresponding page object,
- wherein the print data stored in the page memory that is pointed to by the corresponding page object is deleted upon completion of printing of each page, and the corresponding thumbnail remains on the Web page.

14. The printing apparatus according to claim 13, further comprising a developing unit that develops a print target data of the print job into the print data in bitmap format, wherein the thumbnail creating unit performs the creation of the thumbnail after the development of the print target data into the print data by the developing unit.

15. The printing apparatus according to claim 13, further comprising means for developing a print target data of the page object into the print data in bitmap format, wherein the means for creating the thumbnail performs the creation of the thumbnail concurrently with the development of the print target data into the print data by the means for developing.

16. A method of performing a printing operation based on a print job, comprising:
- providing a Web page;
- creating a job object for the print job and a page object for each page in the print job and each page object contains data that points to print data and a corresponding thumbnail for each page;
- creating a thumbnail for each page to be printed by the print job and the thumbnail is stored in the corresponding thumbnail memory; and
- showing a progress of the print job being performed by the printing apparatus on the Web page in response to a request from a Web browser for browsing the Web page by displaying at a same time the thumbnails of printed pages, which correspond to the print data of each corresponding page object,
- wherein the print data stored in the page memory that is pointed to by the corresponding page object is deleted upon completion of printing of each page, and the corresponding thumbnail remains on the Web page.

17. The method according to claim 16, further comprising a developing unit that develops a print target data of the print job into the print data in bitmap format, wherein the thumbnail creating unit performs the creation of the thumbnail after the development of the print target data into the print data by the developing unit.

18. The method according to claim 16, further comprising developing a print target data of the print job into the print data in bitmap format, wherein creating the thumbnail is performed concurrently with developing the print target data into the print data.

19. The method according to claim 16, wherein providing the Web page includes creating a data file for displaying the Web page, and writing the data file with a command for automatically refreshing the Web page by the Web browser.

20. A method of performing a printing operation based on a print job, comprising:

processing data in a data processing terminal that includes a Web browser for browsing a Web page;

providing the Web page to the data processing terminal;

creating a job object for the print job and a page object for each page in the print job and each page object contains data that points to print data and a corresponding thumbnail for each page;

creating a thumbnail for each page to be printed by the print job and the thumbnail is stored in the corresponding thumbnail memory; and showing a progress of the print job being performed by the printing apparatus by displaying at a same time the thumbnails of printed pages, which correspond to the print data of each corresponding page object; and responding to a request from the data processing terminal, wherein the print data stored in the page memory that is pointed to by the corresponding page object is deleted upon completion of printing of each page, and the corresponding thumbnail remains on the Web page.

21. A computer readable medium storing a computer program used for a printing apparatus that performs a printing operation based on a print job, comprising:

providing a function of creating a job object for the print job and a page object for each page in the print job and each page object contains data that points to print data and a corresponding thumbnail for each page;

providing a function of creating a thumbnail for each page to be printed by the print job and the thumbnail is stored in the corresponding thumbnail memory; and providing a function of providing a Web page in response to a request from a Web browser for browsing the Web page, which shows a progress of the print job being performed by the printing apparatus by displaying at a same time the thumbnails of printed pages, which correspond to the print data of each corresponding page object, wherein the print data included with the page object is deleted upon completion of printing of the corresponding page, and the corresponding thumbnail remains on the Web page.

* * * * *